US009350552B2

(12) United States Patent
Elmenhurst et al.

(10) Patent No.: US 9,350,552 B2
(45) Date of Patent: May 24, 2016

(54) DOCUMENT FINGERPRINTING

(71) Applicant: AUTHENTECT, INC., Redmond, WA (US)

(72) Inventors: Brian J. Elmenhurst, Redmond, WA (US); David Justin Ross, Redmond, WA (US)

(73) Assignee: Authentect, Inc., Redmond, WA (US)

( * ) Notice: Subject to any disclaimer, the term of this patent is extended or adjusted under 35 U.S.C. 154(b) by 17 days.

(21) Appl. No.: 14/290,653

(22) Filed: May 29, 2014

(65) Prior Publication Data
US 2014/0270341 A1 Sep. 18, 2014

Related U.S. Application Data

(63) Continuation of application No. 13/410,753, filed on Mar. 2, 2012, now Pat. No. 8,774,455.

(60) Provisional application No. 61/448,465, filed on Mar. 2, 2011.

(51) Int. Cl.
G06K 9/00 (2006.01)
H04L 9/32 (2006.01)
(Continued)

(52) U.S. Cl.
CPC ............ H04L 9/3247 (2013.01); B07C 5/3422 (2013.01); G06F 17/30253 (2013.01); G06F 17/30542 (2013.01); G06K 9/3216 (2013.01); G06K 2209/01 (2013.01); G06Q 50/32 (2013.01)

(58) Field of Classification Search
CPC ....................................................... B07C 5/342

USPC ......................................................... 382/101
See application file for complete search history.

(56) References Cited

U.S. PATENT DOCUMENTS 4,218,674 A 8/1980 Brosow
4,423,415 A 12/1983 Goldman
(Continued)

FOREIGN PATENT DOCUMENTS

EP 759596 2/1997
EP 1016548 7/2000
(Continued)

OTHER PUBLICATIONS

Li; "Firearm Identification System Based on Ballistics Image Processing"; 2008 Congress on Image and Signal Processing.*
(Continued)

Primary Examiner — Gregory F Cunningham
(74) Attorney, Agent, or Firm — Schwabe, Williamson & Wyatt, PC

(57) ABSTRACT

An automated document processing machine may comprise an electro-mechanical transport subsystem configured to convey a document through the machine, and a camera arranged adjacent the transport and configured to capture an image of a front side of the document. A fingerprinting software component may be configured for processing the captured image of the document to create a unique digital fingerprint of the document based on the front side image, and a software interface may be configured for storing the digital fingerprint in a database of document identifiers in association with a unique alphanumeric identifier so that the document may be subsequently identified in a second processing machine that has access to the database. The digital fingerprint may be responsive to indicia that otherwise appears on the front side of the document, and may comprise data that identifies a document as being unique based on the front side indicia.

18 Claims, 10 Drawing Sheets

Image Dimensions

Initial Scan
315 —— W - 2626 H - 1284

Rescan
W - 2680 H - 1420
↘
325

(51) Int. Cl.
  *B07C 5/342* (2006.01)
  *G06K 9/32* (2006.01)
  *G06F 17/30* (2006.01)
  *G06Q 50/32* (2012.01)

(56) References Cited

U.S. PATENT DOCUMENTS

| | | | |
|---|---|---|---|
| 4,677,435 | A | 6/1987 | Causse D'Agraives |
| 4,921,107 | A | 5/1990 | Hofer |
| 5,031,223 | A | 7/1991 | Rosenbaum |
| 5,079,714 | A | 1/1992 | Manduley |
| 5,422,821 | A | 6/1995 | Allen |
| 5,514,863 | A | 5/1996 | Williams |
| 5,518,122 | A | 5/1996 | Tilles |
| 5,703,783 | A | 12/1997 | Allen et al. |
| 5,719,939 | A | 2/1998 | Tel |
| 5,734,568 | A | 3/1998 | Borgendale |
| 5,745,590 | A | 4/1998 | Pollard |
| 5,883,971 | A | 3/1999 | Bolle |
| 5,923,848 | A | 7/1999 | Goodhand |
| 5,974,150 | A | 10/1999 | Kaish |
| 6,246,794 | B1 | 6/2001 | Kagehiro |
| 6,292,709 | B1 | 9/2001 | Uhl |
| 6,327,373 | B1 | 12/2001 | Yura |
| 6,343,327 | B2 | 1/2002 | Daniels, Jr. |
| 6,360,001 | B1 | 3/2002 | Berger |
| 6,370,259 | B1 | 4/2002 | Hobson |
| 6,434,601 | B1 | 8/2002 | Rollins |
| 6,470,091 | B2 | 10/2002 | Koga |
| 6,539,098 | B1 | 3/2003 | Baker |
| 6,549,892 | B1 | 4/2003 | Sansone |
| 6,697,500 | B2 | 2/2004 | Woolston |
| 6,741,724 | B1 | 5/2004 | Bruce |
| 6,768,810 | B2 | 7/2004 | Emanuelsson |
| 6,778,703 | B1 | 8/2004 | Zlotnick |
| 6,805,926 | B2 | 10/2004 | Cote et al. |
| 6,816,602 | B2 | 11/2004 | Coffelt |
| 6,829,369 | B2 | 12/2004 | Poulin |
| 6,985,926 | B1 | 1/2006 | Ferlauto |
| 7,016,532 | B2 | 3/2006 | Boncyk |
| 7,121,458 | B2 | 10/2006 | Avant |
| 7,171,049 | B2 | 1/2007 | Snapp |
| 7,204,415 | B2 | 4/2007 | Payne |
| 7,212,949 | B2 | 5/2007 | Bachrach |
| 7,356,162 | B2 | 4/2008 | Caillon |
| 7,436,979 | B2 | 10/2008 | Bruce |
| 7,477,780 | B2 | 1/2009 | Boncyk |
| 7,518,080 | B2 | 4/2009 | Amato |
| 7,602,938 | B2 | 10/2009 | Proloski |
| 7,674,995 | B2 | 3/2010 | Desprez |
| 7,680,306 | B2 | 3/2010 | Boutant |
| 7,720,256 | B2 | 5/2010 | Desprez |
| 7,726,548 | B2 | 6/2010 | deLaVergne |
| 7,822,263 | B1 | 10/2010 | Prokoski |
| 7,834,289 | B2 | 11/2010 | Orbke |
| 7,853,792 | B2 | 12/2010 | Cowburn |
| 8,022,832 | B2 | 9/2011 | Vogt |
| 8,108,309 | B2 | 1/2012 | Tan |
| 8,180,174 | B2 | 5/2012 | Di Venuto |
| 8,194,938 | B2 | 6/2012 | Wechsler |
| 8,428,772 | B2 | 4/2013 | Miette |
| 8,477,992 | B2 | 7/2013 | Paul |
| 8,520,888 | B2 | 8/2013 | Spitzig |
| 8,526,743 | B1 | 9/2013 | Campbell |
| 8,774,455 | B2 | 7/2014 | Elmenhurst |
| 9,058,543 | B2 | 6/2015 | Campbell |
| 9,152,862 | B2 | 10/2015 | Ross |
| 2001/0010334 | A1 | 8/2001 | Park |
| 2001/0054031 | A1 | 12/2001 | Lee |
| 2002/0015515 | A1 | 2/2002 | Lichtermann |
| 2002/0168090 | A1* | 11/2002 | Bruce .............. G06K 9/033 382/101 |
| 2003/0046103 | A1 | 3/2003 | Amato |
| 2003/0091724 | A1 | 5/2003 | Mizoguchi |
| 2003/0120677 | A1 | 6/2003 | Vernon |
| 2003/0179931 | A1 | 9/2003 | Sun |
| 2003/0182018 | A1 | 9/2003 | Snapp |
| 2003/0208298 | A1 | 11/2003 | Edmonds |
| 2004/0027630 | A1 | 2/2004 | Lizotte |
| 2004/0112962 | A1 | 6/2004 | Farrall |
| 2004/0218791 | A1 | 11/2004 | Jiang |
| 2005/0065719 | A1 | 3/2005 | Khan |
| 2005/0086256 | A1 | 4/2005 | Owens |
| 2005/0119786 | A1 | 6/2005 | Kadaba |
| 2005/0131576 | A1 | 6/2005 | DeLeo |
| 2005/0188213 | A1 | 8/2005 | Xu |
| 2005/0251285 | A1 | 11/2005 | Boyce |
| 2006/0010503 | A1 | 1/2006 | Inoue et al. |
| 2006/0083414 | A1 | 4/2006 | Neumann |
| 2006/0131518 | A1 | 6/2006 | Ross |
| 2006/0177104 | A1 | 8/2006 | Prokoski |
| 2006/0253406 | A1 | 11/2006 | Caillon |
| 2007/0094155 | A1 | 4/2007 | Dearing |
| 2007/0263267 | A1 | 11/2007 | Ditt |
| 2007/0282900 | A1 | 12/2007 | Owens |
| 2008/0011841 | A1 | 1/2008 | Self |
| 2008/0130947 | A1 | 6/2008 | Ross |
| 2008/0219503 | A1 | 9/2008 | DiVenuto |
| 2008/0250483 | A1 | 10/2008 | Lee |
| 2008/0255758 | A1 | 10/2008 | Graham |
| 2008/0272585 | A1* | 11/2008 | Conard .............. G06K 9/00577 283/67 |
| 2008/0294474 | A1 | 11/2008 | Furka |
| 2009/0028379 | A1 | 1/2009 | Belanger |
| 2009/0057207 | A1 | 3/2009 | Orbke |
| 2009/0106042 | A1 | 4/2009 | Maytal |
| 2009/0154778 | A1 | 6/2009 | Lei |
| 2009/0157733 | A1 | 6/2009 | Kim |
| 2009/0271029 | A1 | 10/2009 | Doutre |
| 2009/0307005 | A1 | 12/2009 | O'Martin |
| 2010/0027834 | A1 | 2/2010 | Spitzig |
| 2010/0104200 | A1 | 4/2010 | Baras et al. |
| 2010/0163612 | A1 | 7/2010 | Caillon |
| 2010/0166303 | A1 | 7/2010 | Rahimi |
| 2010/0174406 | A1 | 7/2010 | Miette |
| 2011/0161117 | A1 | 6/2011 | Busque et al. |
| 2011/0194780 | A1 | 8/2011 | Li et al. |
| 2011/0235920 | A1 | 9/2011 | Iwamoto et al. |
| 2012/0130868 | A1 | 5/2012 | Loken |
| 2012/0250945 | A1 | 10/2012 | Peng |
| 2013/0284803 | A1 | 10/2013 | Wood |
| 2014/0140570 | A1 | 5/2014 | Ross |
| 2014/0140571 | A1 | 5/2014 | Elmenhurst |
| 2014/0184843 | A1 | 7/2014 | Campbell |
| 2015/0067346 | A1 | 3/2015 | Ross |
| 2015/0117701 | A1 | 4/2015 | Ross |

FOREIGN PATENT DOCUMENTS

| | | |
|---|---|---|
| EP | 2869240 A2 | 5/2015 |
| EP | 2869241 A2 | 5/2015 |
| GB | 2097979 | 11/1982 |
| JP | 61-234481 | 10/1986 |
| WO | 2006/038114 | 4/2006 |
| WO | 2007/071788 A1 | 6/2007 |
| WO | 2007/090437 A1 | 8/2007 |
| WO | 2009/030853 A1 | 3/2009 |
| WO | 2012/145842 | 11/2010 |
| WO | 2013/126221 A1 | 8/2013 |

OTHER PUBLICATIONS

Huang, et al., "An Online Ballistics Imaging System for Firearm Identification"; 2010 2nd International Conference on Signal Processing Systems (ICSPS).*

Clifton Smith; "Fireball: A Forensic Ballistic Imaging System"; Security Science, Edith Cowan University; IEEE; 1997.*

(56) References Cited

OTHER PUBLICATIONS

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

NCOA Link at http://ribbs.usps.gov/ncoalink/ncoalink_print.htm; dated May 27, 2009; 3 pages.

Leng, et al., "A Novel Binarization Algorithms for Ballistics Imaging Systems"; 2010 3rd International Congress on Image and Signal Processing (CISP2010).

Stolowitz Ford Cowger LLP; Related Case Listing; Portland, OR; Aug. 14, 2014; 1 Page.

* cited by examiner

Image Dimensions
Initial Scan
315 — W - 2626 H - 1284
Rescan
W - 2680 H - 1420
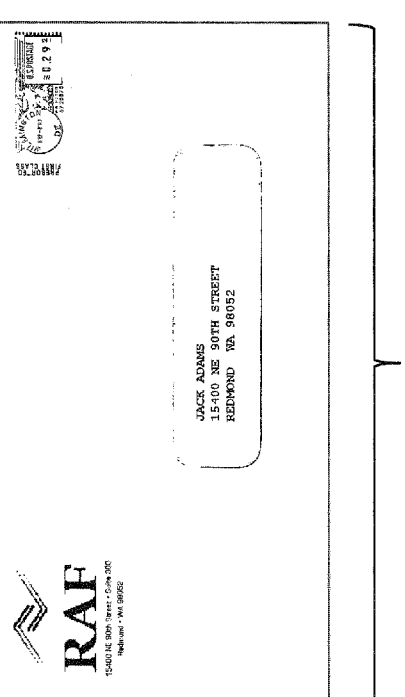
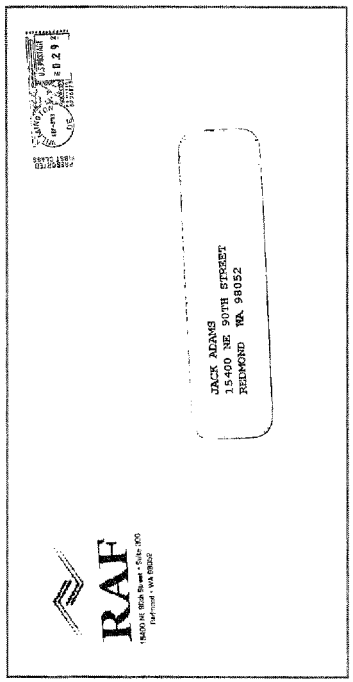
FIG. 3

Number of Paragraphs
Initial Scan  
2
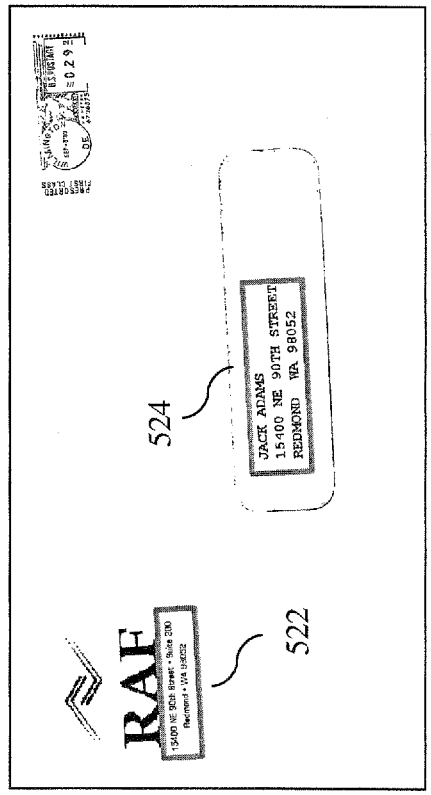
Rescan  
2
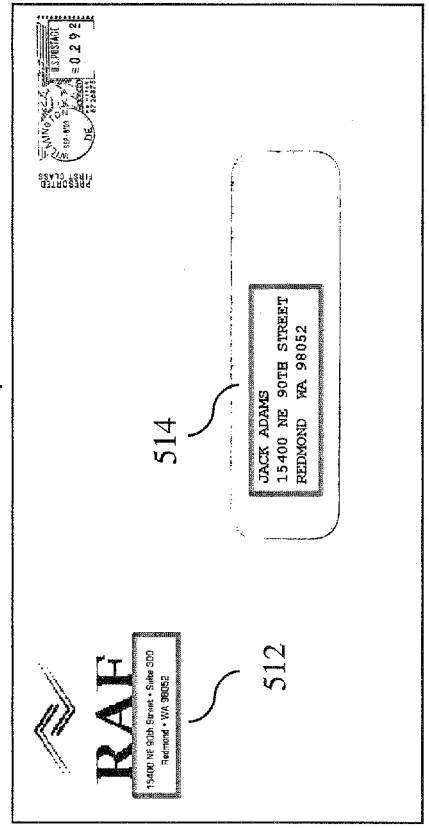
FIG. 5

Line Dimensions
| Initial Scan | | Rescan | |
|---|---|---|---|
| Paragraph 1 | Paragraph 2 | Paragraph 1 | Paragraph 2 |
| L-1: H24 W443 | L-1: H30 W294 | L-1: H24 W443 | L-1: H33 W294 |
| L-2: H24 W285 | L-2: H31 W594 | L-2: H24 W286 | L-2: H35 W594 |
| | L-3: H32 W506 | | L-3: H33 W505 |
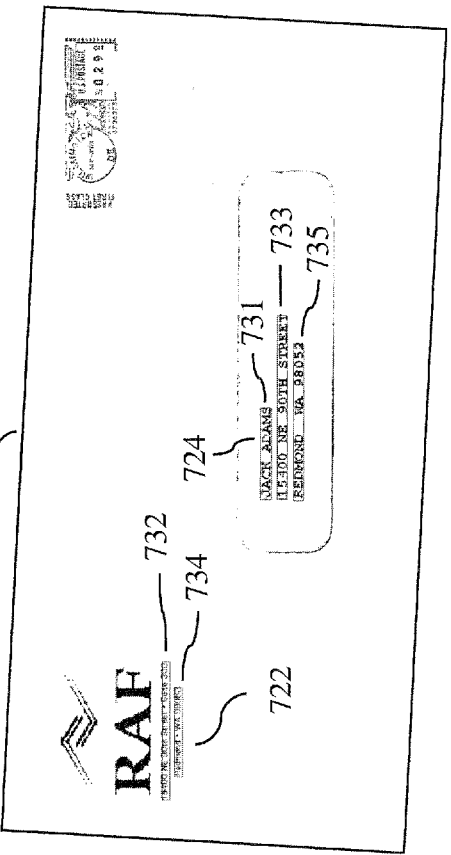
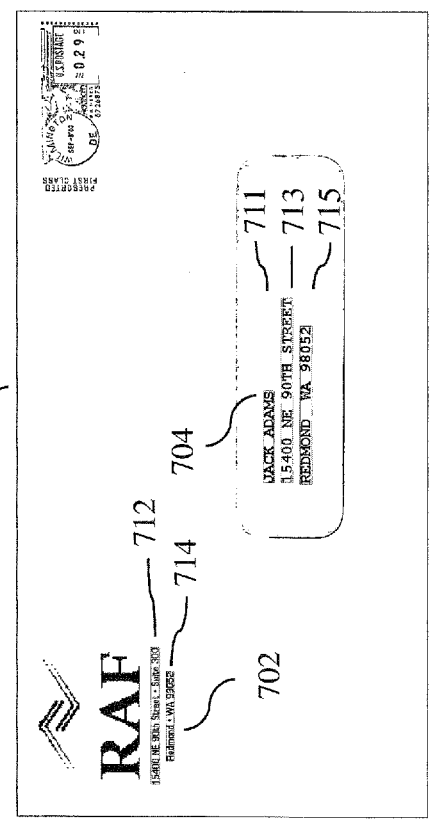
FIG. 7

DOCUMENT FINGERPRINTING

RELATED APPLICATIONS

This application is a continuation of U.S. patent application Ser. No. 13/410,753 filed Mar. 2, 2012 which claims the benefit of Provisional Application Ser. No. 61/448,465, filed on Mar. 2, 2011, all of which is herein incorporated by reference in its entirety.

COPYRIGHT NOTICE

© 2014 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BRIEF DESCRIPTION OF THE DRAWINGS

FIG. 3 illustrates one or more mail piece images and associated image dimensions.

FIG. 5 illustrates a number of paragraphs associated with one or more mail piece images.

FIG. 7 illustrates line dimensions associated with one or more mail piece images.

BACKGROUND OF THE INVENTION

A mail piece received at a postal distribution center may be scanned for identification to finalize a destination of the mail piece. When a mail piece cannot be finalized (e.g., contains insufficient readable information to allow its full ZIP code sprayed on the front), a fluorescent bar code may be sprayed on the back. The bar code may be referred to as an ID tag. The ID tag may identify that particular mail piece so that when later, after the delivery address has been successfully coded, the coding results may be reassociated with that mail piece and the delivery sequence ID tag may be sprayed on it.

The mail piece may have a fluorescent bar code or ID tag sprayed on the back. While the ID tag does not need to be sprayed, this is typical in the industry. The ID tag may be sprayed on the mail piece not just when the mail piece cannot be finalized, but also for general tracking purposes. The ID tag may be used to associate later processing results with that particular mail piece.

The contents of the ID tag may be associated with an image of the front of the mail piece in a database. A mail piece that was not successfully finalized may be sorted to a reject bin. The image (and associated ID tag) may be transmitted for non-real time processing of some sort, either computer or manual. Assuming the image can be finalized after the additional processing, the ID tag may be associated in the database with the finalized ZIP code that may then be sprayed on the mail piece.

Sometime later, the mail piece may be rescanned, with the ID tag read. The destination ZIP code may be retrieved from the database and sprayed on the mail piece, which may then enter the automatic processing procedures. The mail piece may be routed to its destination by the automatic processing procedures using the bar code.

DETAILED DESCRIPTION

Figure 1:
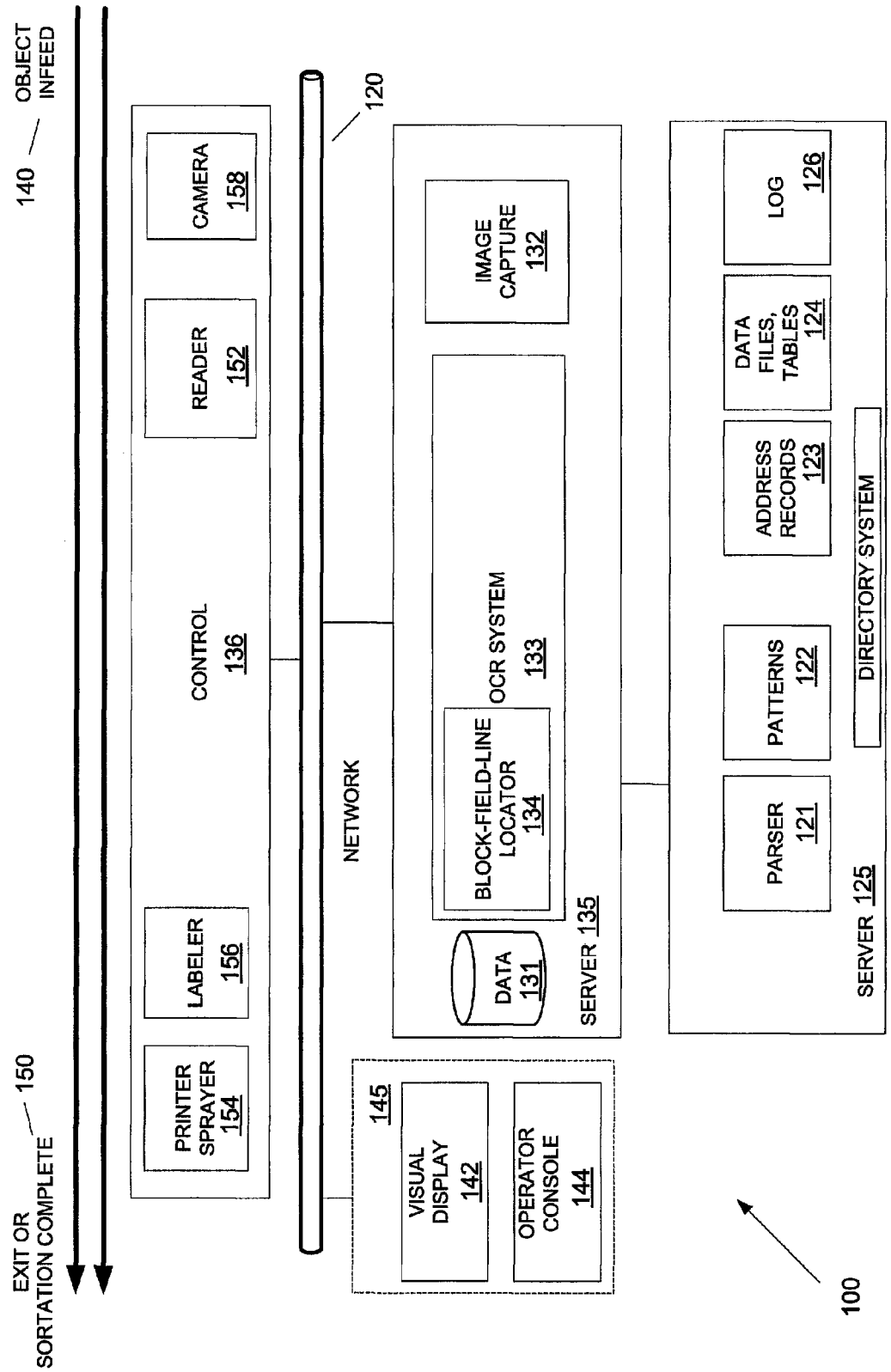
FIG. 1 illustrates an example system configured to process documents.

FIG. 1 illustrates an example system 100 configured to process documents. Objects to be analyzed, identified, sorted, delivered, or classified may be fed into the system 100 at the object infeed 140 before being processed and ultimately removed at the exit 150 or as sortation completes. The object may be processed and/or operated on by any or all of a control 136, a reader 152, a camera 158, a printer/sprayer 154, and/or a labeler 156.

A directory system 125 is illustrated as including a parser 121, patterns 122, address records 123, data files and tables 124, and one or more logs 126. An image processing system 135 is illustrated as including a database 131, image capture block 132, and an Optical Character Recognition (OCR) system 133, that may include a Block-Field-Line Locator 134. An interface system 145 is illustrated as including a visual display 142 and an operator console 144. A network 120 may operatively connect the directory system 125, image processing system 135, interface system 145, or any combination thereof. A sortation device may be used to physically move, deliver, or sort the objects through the system 100.

The system 100 may be configured to process a set of images of mail pieces. Each image may be parsed into regions of interest and/or components, and a particular component may be associated with, and/or matched to, one or more lines of text and/or input data fields (e.g. STATE, ZIP, ADDRESSEE NAME). A customer identification may be associated with an address block description or pattern 122, address records 123, and/or other data files and tables 124. The OCR system 133 may use the Block-Field-Line Locator 134 to identify a region of interest or address block and subsequently the individual lines within that address block data. This line data may be passed on to the directory system 125, which may then use the pattern 122, data files and tables 124, address records 123, and/or parser 121 to identify individual address components and addresses in each image.

The system 100 may take the parsed image data and deduce the allowed patterns in the addresses for that area and/or category. For example, it can be determined that the bottom-most line (e.g., as detected by a parser) has the rightward-most entity labeled "ZIP-5", the one to the left of that labeled "STATE" and the remaining, leftward-most entity labeled "CITY". It can therefore be deduced that CITY→STATE→ZIP on the bottom-most line is an allowed pattern that may be matched. The system 100 may extract the patterns automatically from labeled and/or described set of images, whether the patterns are simple or complex.

A physical object may be provided with enough information on it to allow the system 100 to determine and perform a desired function. For a mail system this may be an envelope with some attempt at providing, or approximation to, an address on the envelope. For a manufacturing plant or parts depot, this may be a label or serial number which identifies a part or otherwise associates information with the part. For a jeweler, art dealer, appraiser, or other type of evaluator, the object information may comprise a unique diffraction pattern of a gem stone or a surface crystal fracture caused when a coin is struck. Scratches and other indications of usage of an object that may occur during manufacture, assembly, handling, environmental degradation, etc. may be used to uniquely identify the object. Other applications may include forensic and/or biological analysis of tissue samples, blood samples, or other samples that may be used to uniquely identify, distinguish, and/or provide a match with a particular person of interest. For example, a blood stain associated with one person may comprise a different level and/or pattern of blood proteins as compared to a blood stain associated with another person.

The system 100 may be configured to extract the information from the object (object information) and then categorize the extracted information (categorizing information), for example, as belonging to a predetermined area and/or category. For a mail piece, the object information and/or categorizing information may be determined by an address block locator and/or an OCR system.

A defined pattern or set of patterns associated with the object information and/or the categorizing information may exist a priori (e.g. a Universal Postal Union-defined address format for each country), or it may be defined for a specific application by a vendor or by a customer. Part of the defined pattern may include information on how to apply the pattern either alone or in a defined and prioritized order with other defined patterns, and what generic and specific information to return.

The database 131 may contain one or more lists of classification elements, individual applicable element values, and/or a system output when a desired pattern has been matched. For a mail application this database 131 may contain, for example, a list of states, cities within each state, neighborhoods within each city, and/or carrier routes within each neighborhood. The output may be the routing ZIP code. The database hierarchy may correspond to the classifying elements to be found on the object and to the patterns created for classifying the object. In some examples, one or more digital fingerprints may be stored in the database 131, together with a plurality of document identifiers, and the digital fingerprints may be associated with unique alphanumeric identifiers.

The parser 121 may determine which lines and/or input data fields on the object correspond to which elements in the defined patterns, and to which elements and element values in the database. The parser 121 may perform fuzzy matching on the input data fields and interpolate missing elements where possible.

The relationship between the defined pattern and the elements in the database may be viewed as similar to that between a defined class in, for example, C++ and the many possible instantiations of that class. The pattern or patterns may show the overall structure and interrelationships of object elements, while the database may provide specific examples, element values of those patterns. For example, the pattern may include "city name" and the database may include "New Orleans", "Jackson", or "Sioux Falls" which are examples of city names that might be found on an envelope. The element values in the database are usually meant to encompass all or nearly all the allowable element values.

The systems and apparatus illustrated in FIG. 1 may be understood to correspond with, or provide functionality for, the systems, apparatus, methods, and processes described in the specification, for example those illustrated in any or all of FIGS. 2-10. Additional examples of document processing systems may be found in U.S. patent application Ser. No. 12/917,371, filed on Nov. 1, 2010, and entitled Defined Data Patterns for Object Handling, which is herein incorporated by reference in its entirety.

Figure 2:
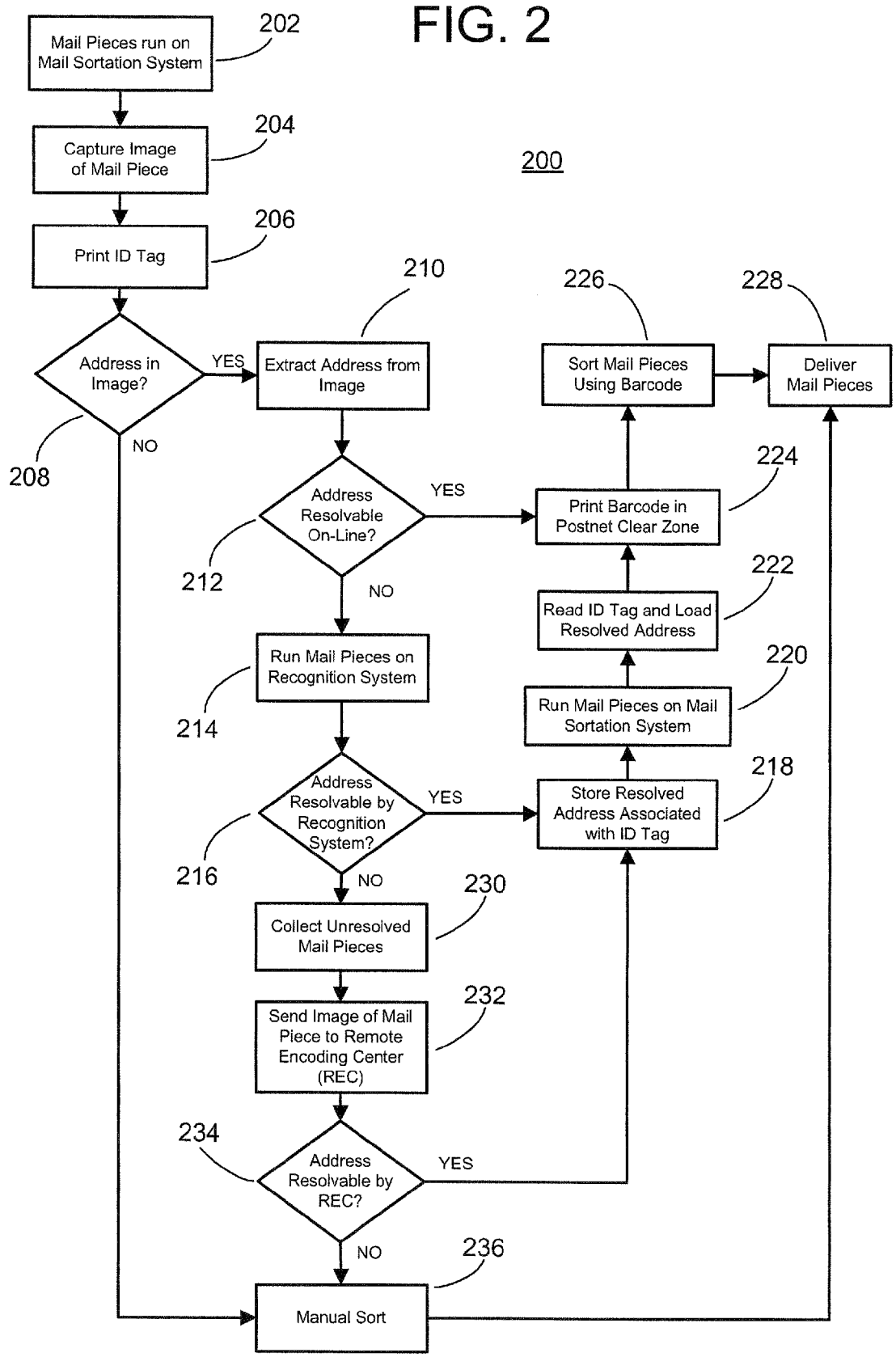
FIG. 2 illustrates an example process of document processing.

FIG. 2 illustrates an example process 200 of a document processing system. At operation 202, a mail piece may be run on a mail sortation system, which in some examples may comprise a mail service Input Sub-System (ISS). At operation 204, an image of the mail piece may be captured, for example, by one or more cameras and/or optical devices. At operation 206, an identification (ID) tag may be printed on the mail piece.

At operation 208, the document processing system may determine if the mail piece image comprises an address. If the mail piece image does not comprise an address, or if the address cannot be identified from the image, the mail piece may be rejected for manual sorting at operation 236 prior to delivery at operation 228. In response to analyzing the image for a legible address at operation 208, the document processing system may extract the address from the image at operation 210. At operation 212, the document processing system additionally may determine if the address is resolvable on-line, for example, during processing of a batch of mail pieces.

In applications where read rate is low and/or where near perfection is required, a process known as local or remote video encoding may be utilized. The video encoding process may be described as follows. A unique ID may be created for the mail piece at the initial failed recognition attempt. An image of the mail piece may be captured, and the ID may be associated with the image. The ID may be sprayed, for example, with florescent ink on the back of the mail piece (the ID tag).

If the mail piece does not comprise a resolvable address, the mail piece may be run on a recognition system at operation 214, which in some examples may be run offline and/or comprise a backend Remote Character Recognition (RCR) processing system. In a Multi-Line Optical Character Recognition (MLOCR) processing system, an image of the mail piece may be captured and sent to the Optical Character Recognition (OCR) engine where the destination address may be converted to text. At operation 216, the recognition system may determine if the mail piece image comprises an address that is resolvable. If the mail piece image does not comprise a resolvable address, the mail piece may be collected at operation 230 for additional processing. For example, the image of the mail piece may be sent to a Remote Encoding Center (REC) at operation 232 in a further attempt to resolve the address at operation 234. If the address still cannot be resolved, the mail piece may be rejected for manual sorting at operation 236.

In one example, the document processing system may determine if the address is resolvable on-line, for example, during processing of a batch of mail pieces. The text data then may be sent to a directory to determine if the mail piece can be assigned to an 11, 9, 5, or 0 digit zip code.

In some examples, the physical mail piece may be removed from the transport system. The image of the mail piece may be placed in a queue where the address elements are entered into the system. The address elements may be compared against the directory to identify the associated ID. The physical mail piece may then be rerun on the transport in a mode where the ID is read. If the ID is reconciled, the destination may be sprayed on the front of the mail piece. However, the cost of maintaining two sets of capture and printer technologies may be expensive and time consuming. For example, the camera may need to be adjusted for focus. Similarly, a device for spraying the back side of the mail piece may also require maintenance, such as cleaning the ink nozzles.

In response to analyzing the image for a resolvable address at operation 216 and/or at operation 234, the document processing system may store the resolved address at operation 218. The resolved address may be associated with the ID tag of the mail piece. At operation 220, the mail piece may be run on a mail sortation system, which in some examples may comprise a mail system Output Sub-System (OSS), where the ID tag may be read. In one example, the MLOCR processing system may then sort the mail piece based on the lookup. In response to reading the ID tag, the resolved address may be loaded from a database and/or lookup table, at operation 222. After determining that the address is resolvable at operation 212 and/or after loading the resolved address at operation 222, the barcode may be printed in the Postnet Clear Zone at operation 224. At operation 226, the mail piece may be sorted using the printed barcode for subsequent delivery at operation 228.

Each mail piece may include a variety of elements which, individually or in combination, may uniquely identify the mail piece. Among the unique elements on the mail piece are the contents of the delivery and destination addresses, the shape of the address blocks, the location on the envelope of the address blocks, the position of indicia, the characteristics of any handwriting, the type fonts used, other identification elements, or any combination thereof. Any unique characteristic or combination of characteristics of the mail piece may be used to identify the mail piece. The identification obtained from the unique elements may be used to identify or track a mail piece, or to re-identify a particular mail piece. The unique elements may be scanned or identified without the need for a second camera in the mail processing system.

FIGS. 3 to 9 illustrate example features associated with document fingerprinting. The features may be used in one or more processes for comparing an initial scanned image with a rescanned image, for example. Whereas some of the examples may assume that the first and second images are used to identify the same mail piece, in other examples, the first and second images may be used to distinguish two different mail pieces. Additionally, whereas any one example may be understood to identify unique characteristics of the mail piece, some examples may be understood to use two or more different sets of unique characteristics using any combination of FIGS. 3 to 9 to identify and/or distinguish the mail piece. The comparison of characteristics may be definitive (e.g. there is a ZIP Code reading 91445 at position x=1955, y=939) or probabilistic (e.g. a statistical comparison of a compendium of handwritten stroke shapes across the two images).

FIG. 3 illustrates one or more mail piece images and associated image dimensions. A first image 310, which may comprise an initial scan of a mail piece, may be associated with, and/or identified by, first image dimensions 315. The first image dimensions 315 may identify the dimensions of the first image 310 and, indirectly, the dimensions of the mail piece itself. In the illustrated example, the first image of the mail piece may identify a width (W) of 2626 pixels and a height (H) of 1284 pixels.

A second image 320, which may comprise a rescanned image of the mail piece, may similarly be identified by image dimensions, such as second image dimensions 325. The second image dimensions 325 may identify a width of 2680 pixels and a height of 1420 pixels. Although the image dimensions 315, 325 associated with the first and second images, respectively, may not be identical, the system may nevertheless use this information to determine that a mail piece associated with the first and second images 310, 320 is in fact the same mail piece.

Additionally, some differences between first and second images 310, 320 may be intentional and/or expected. For example, a change to second image 320 from first image 310 may include the addition of a cancellation mark and/or the addition of an ID tag to the same mail piece. Similarly, second image 320 may include evidence of normal usage and/or processing, such as a bent corner or wrinkle that was not present when first image 310 was obtained.

The system may be configured to identify the order of when certain changes may be made to an object, such as the mail piece. For example, a cancellation mark may normally be applied to the mail piece in between obtaining first and second images 310, 320. In a first example, the presence of the cancellation mark in second image 320 and absence of the cancellation mark in first image 2310 may not disqualify first and second images 310, 320 from being a match, e.g., the presence of the cancellation mark may be ignored. However, in a second example, the presence of the cancellation mark in first image 320 and absence of the cancellation mark in second image 320 may indicate first and second images 310, 320 do not match. In the Second example, the system may be configured to identify a match only when both first and second images 310, 320 include the cancellation mark.

The system may provide for a tolerance or range of variation in image dimensions for the associated images 310, 320 of the mail piece, for example, to account for differences in scanning devices, rates of transport (scanning speeds), alignment and/or skewing of the mail piece, damage to the mail piece, additional markings made on the mail piece, or any combination thereof. The tolerance or allowable range of variation may be predetermined. The tolerance may vary based on the type of document being analyzed, or on the feature or features used to identify the document fingerprint. The tolerance may be applied as an allowed range, as a probability that decreases with increasing mismatch, or in other ways.

Figure 4:
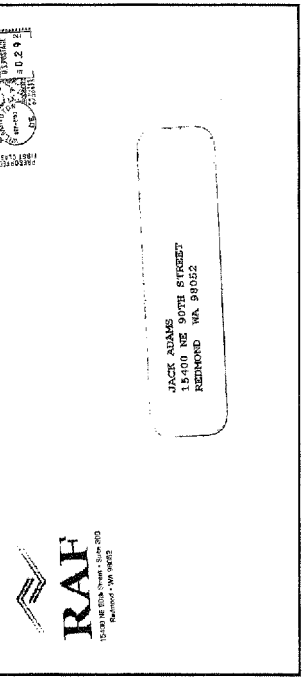
FIG. 4 illustrates a total number of pixels associated with one or more mail piece images.

FIG. 4 illustrates a total number of pixels, or a pixel count, associated with one or more mail piece images, such as a first image 410 and a second image 420. In some examples, the first image 410 may comprise an initial scan of a mail piece, and the second image 420 may comprise a rescanned image of the mail piece. The total number of pixels 415 associated with the first image 410 is shown as including 69,286 pixels, whereas the total number of pixels 425 associated with the second image 420 is shown as including 69,292 pixels.

The system may provide for a tolerance or range of variation in total pixel count for the associated images 410, 420 of the mail piece, while still determining that the elements associated with the first and second images 410, 420 may uniquely identify the same mail piece. In some examples, the total number of pixels 415 and/or 425 may be determined from an analysis of the destination address 430, return address 440, postage indicia 450, cancellation markings, other markings associated with the mail piece(s) and/or image(s), or any combination thereof. The degree of match may be definitive within a range or probabilistic.

FIG. 5 illustrates a number of paragraphs associated with one or more mail piece images, such as a first image 510 and a second image 520. In some examples, the first image 510 may comprise an initial scan of a mail piece, and the second image 520 may comprise a rescanned image of the mail piece. In the illustrated example, the first image 510 may be associated with two paragraphs, including a first paragraph 512 and a second paragraph 514. Similarly the second image 520 may be associated with two paragraphs 522, 524. In some examples, the first paragraph 512 may be associated with a return address and/or the second paragraph 514 may be associated with a destination address.

The paragraphs are not necessarily defined as lines of characters, and are not necessarily rectangular, but may be identified more generically as grouped together or concentrated pixels located or arranged in a region of the mail piece. In one example, both the image of the paragraph and the associated dimension of the paragraph (e.g., width and height) may be determined for the first and second images 510, 520.

Figure 6:
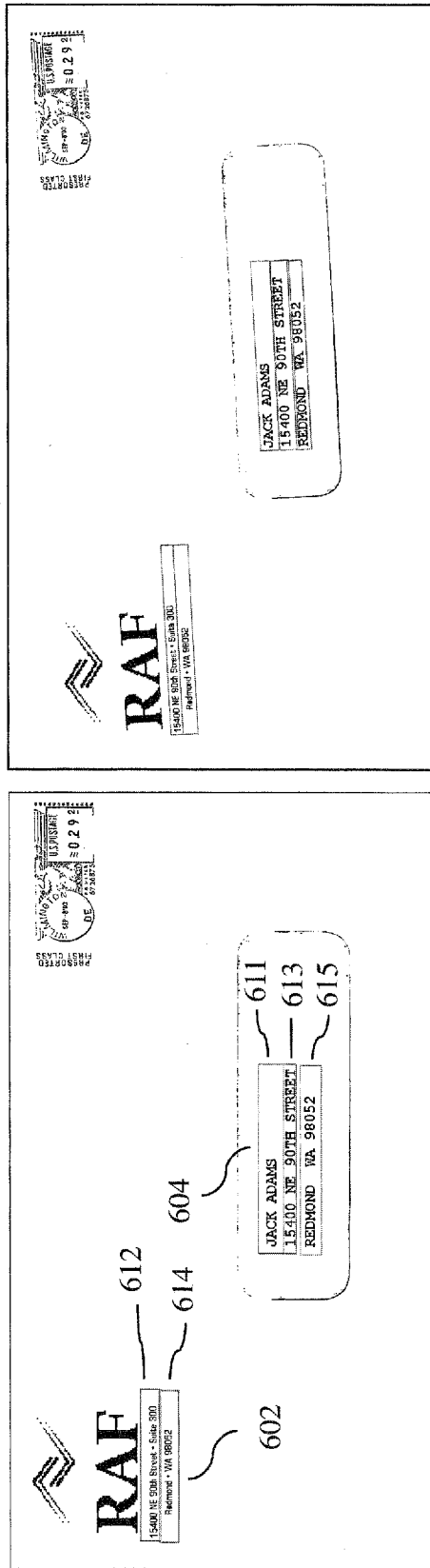
FIG. 6 illustrates a number of lines associated with one or more mail piece images.

FIG. 6 illustrates a number of lines associated with one or more mail piece images, such as a first image 610 and a second image 620. In some examples, the first image 610 may comprise an initial scan of a mail piece, and the second image 620 may comprise a rescanned image of the mail piece. The number of lines may correspond with one or more paragraphs, such as a first paragraphs 602 and a second paragraph 604. For example, the first paragraph 602 may be associated with, and/or identified as including, two lines, such a first line 612 and a second line 614. The second paragraph 604 may be associated with, and/or identified as including, three lines, such a first line 611, a second line 613, and a third line 615. The second image 620 similarly may be associated with a number paragraphs and/or of lines 625.

In addition to determining the number of lines in each paragraph, the dimensions (e.g., width and height) of each line may also be determined. FIG. 7 illustrates line dimensions 730, 740 associated with one or more mail piece images, such as a first image 710 and a second image 720, respectively. In some examples, the first image 710 may comprise an initial scan of a mail piece, and the second image 720 may comprise a rescanned image of the mail piece.

The first image 710 may be associated with a plurality of paragraphs, including a first paragraph 702 and a second paragraph 704. The first paragraph 702 may be associated with, and/or identified as including, two lines, such a first line 712 and a second line 714. The second paragraph 704 may be identified may be associated with, and/or identified as including, three lines, such a first line 711, a second line 713, and a third line 715.

The second image 720 may similarly be associated with a plurality of paragraphs, including a first paragraph 722 and a second paragraph 724. The first paragraph 722 of the second image 720 may comprise a first line 732 and/or a second line 734. The second paragraph 724 of the second image 720 may comprise a first line 731, a second line 733, and/or a third line 735.

The first line 712 associated with the first paragraph 702 of the first image 710 may be associated with a height of 24 pixels and a width of 443 pixels, and the second line 714 associated with the first paragraph 702 of the first image 710 may be associated with a height of 24 pixels and a width of 285 pixels. On the other hand, the first line 732 associated with the first paragraph 722 of the second image 720 may be associated with a height of 24 pixels and a width of 443 pixels, and the second line 734 associated with the first paragraph 722 of the second image 720 may be associated with a height of 24 pixels and a width of 286 pixels.

In the illustrated example, the width and height of the first lines 712, 732 may be identical, whereas the width of the second line 734 associated with the second image 720 may be one pixel (or more) greater (or less) than the width of the second line 714 associated with the first image 710.

As previously described, the system may provide for a tolerance and/or range of variation in total pixel count for the associated images of the mail piece while still determining that the elements identified for both the first and second images 710, 720 may uniquely identify the same mail piece. Similarly, the system may provide for a tolerance and/or range of variation in total pixel count for the associated line and/or lines of one or more paragraphs in an initial scanned image and a rescanned image. All such comparisons may be definitive within a range or probabilistic.

Figure 8:
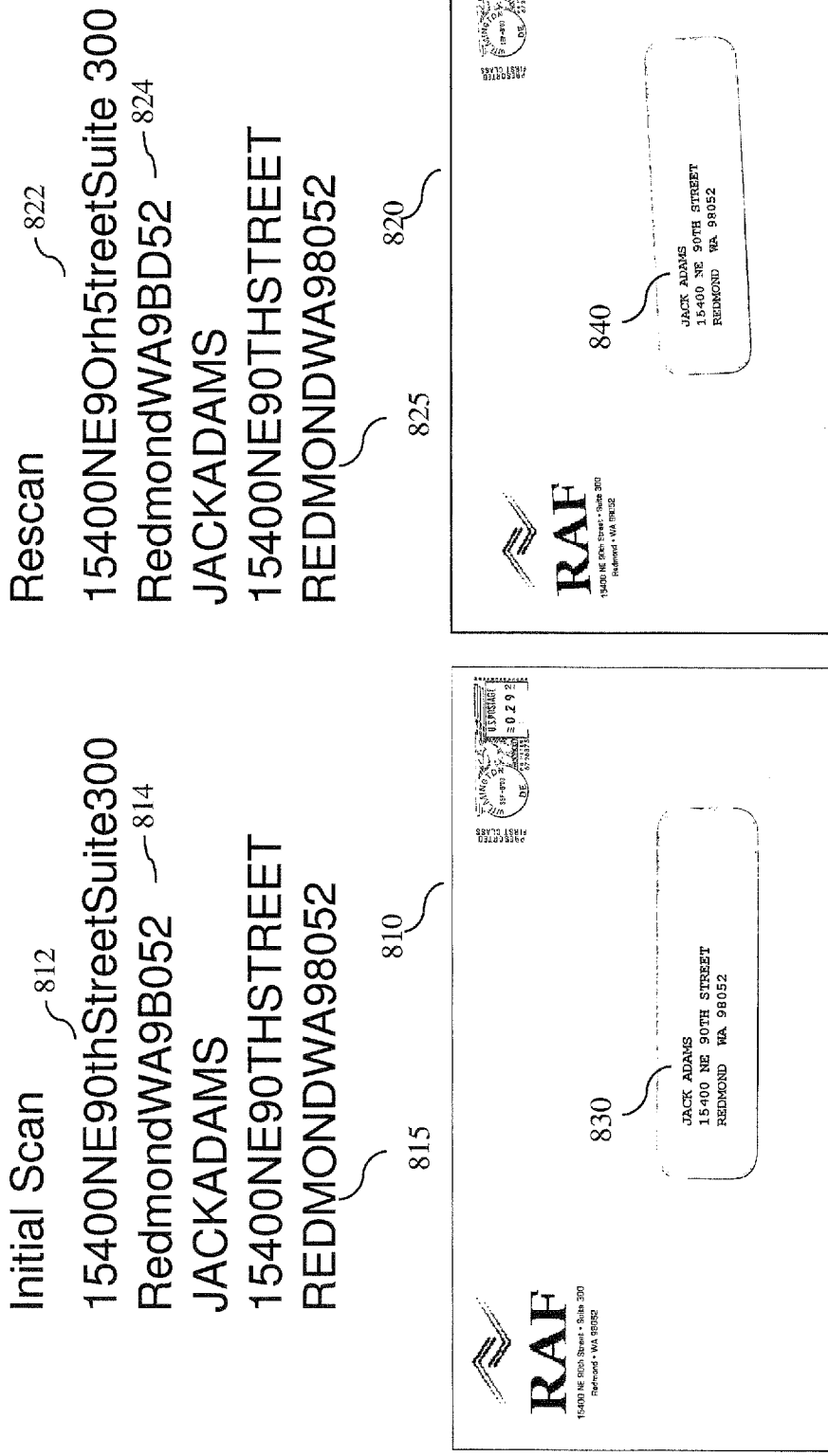
FIG. 8 illustrates a comparison of text associated with one or more mail piece images.

FIG. 8 illustrates a comparison of text associated with one or more mail piece images, such as a first image 810 and a second image 820. Text 815 associated with the first image 810 may be compared with the corresponding text 825 associated with the second image 820. For example, the first image 810 may be associated with an initial scanned paragraph 830, and the second image 820 may comprise a rescanned paragraph 840.

Differences between the text 815 associated with the first image 810 and the text 825 associated with the second image 820 may result from limitations in a character recognition system and/or to differences in processing the mail piece during the initial scan and rescan operations, by way of example. A first line of text 812 associated with the first image 810 may be compared with a first line of text 822 associated with the second image 820.

In the illustrated example, the first line of text 812 reads "15400NE90thStreetSuite300" whereas the first line of text 822 reads "15400NE9Orh5treetSuite300." The first line of text 812 matches the text found in the initial scanned paragraph 830 of the first image 810; however, the first line of text 822 incorrectly reads "9Orh5treet" instead of "90thStreet" as shown in the rescanned paragraph 840.

A second line of text 814 associated with the first image 810 may be compared with a second line of text 824 associated with the second image 820. In some examples, the corresponding text 815, 825 associated with both the first and second images 810, 820 may have resulted from an erroneous reading of paragraphs 830, 840, respectively, such as when the zip code "98052" is read as "9B052", as illustrated in the second line 814 of text 815, and as "9BD52", as illustrated in the second line 824 of text 825. In addition to comparing the text in each paragraph, the location (e.g., relative position on the mail piece) of each character, or set of characters, of the text may also be compared in determining if the second image 820 identifies the same particular mail piece associated with the first image 810.

Figure 9:
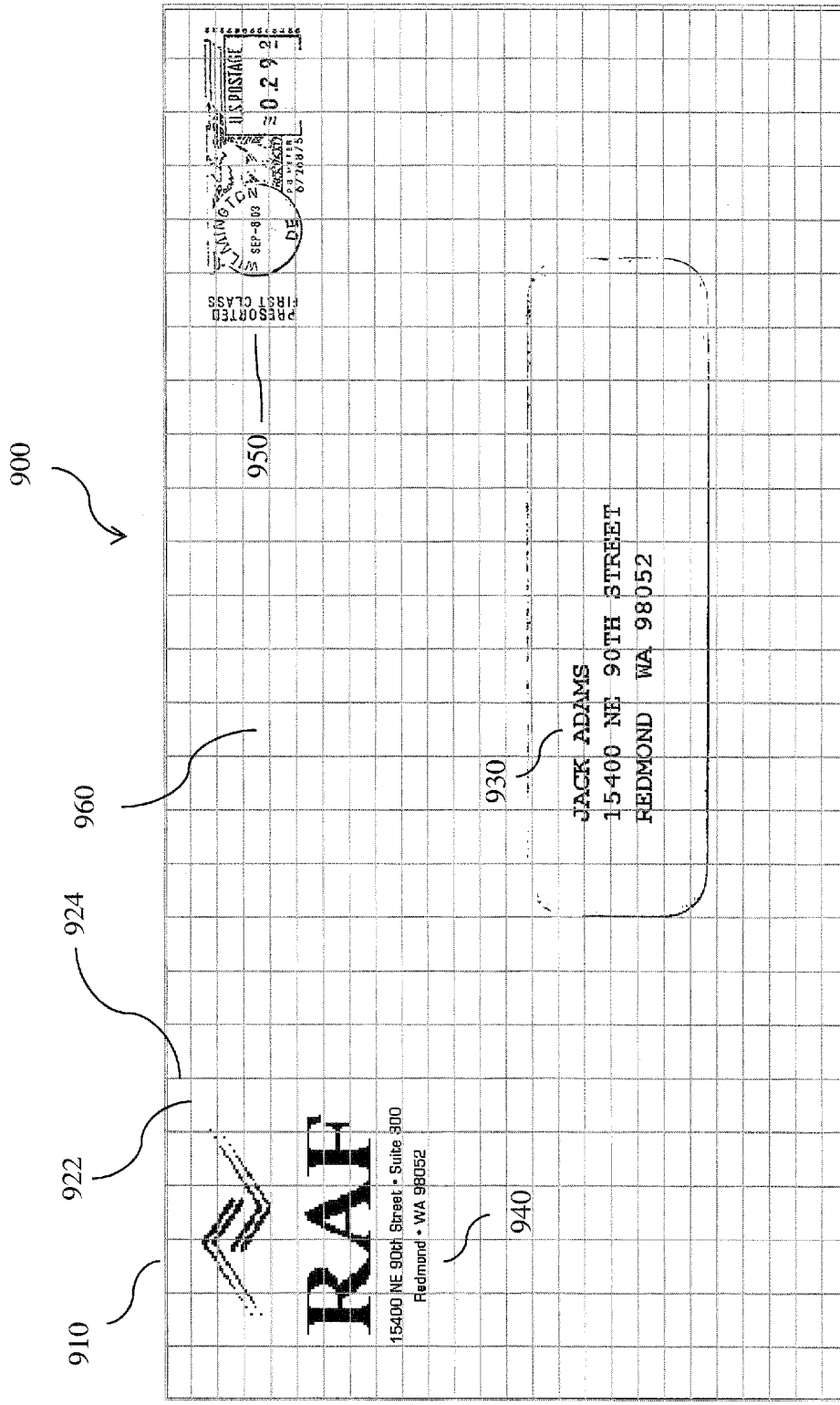
FIG. 9 illustrates an example image of a mail piece and a coordinate system for providing, determining, identifying, and/or generating a characterization of one or more mail pieces.

FIG. 9 illustrates an example image of a mail piece 910 and a coordinate system 900 for providing, determining, identifying, and/or generating a characterization of one or more mail pieces. For example, an image of a mail piece 910 may comprise a substantially white area 960. The substantially white area 960 may be distinguished from one or more substantially dark areas comprising a destination address 930, a return address 940, postage indicia 950, cancellation markings, spray, stamps, writing, stains, smudges, pictures, written and typed words, or any combination thereof. In some examples, the postage indicia 950 may comprise one or more of an image, an amount, a date, and/or a position of a stamp placed on the mail piece.

The white area 960 and/or the dark areas may be associated with, and/or identified with reference to, a coordinate system 900. The coordinate system 900 may comprise one or more coordinates, such a horizontal coordinate 922 and/or a vertical coordinate 924. The coordinate system 900 may be configured to identify a position, dimension, concentration, percentage, number, other aspect, or any combination thereof, of the white area 960 and/or the dark areas. For example, the destination address 930 may be associated with a first set of coordinates, the return address 940 may be associated with a second set of coordinates, and/or the postage indicia 950 may be associated with a third set of coordinates.

The characterization of the image of the mail piece 910 may provide a means for mapping out every pixel associated with the white and dark areas. For example, the coordinate system 900 may be used to determine and/or compare the elements illustrated in FIGS. 3 to 8.

A "Document Fingerprint" may be determined for each document, such as a mail piece, based on one or more elements, such as those described with reference to FIGS. 3 to 9. The elements may be processed separately or in combination, using multiple techniques for determining that a document is unique and/or differentiated from another similar document. Comparison of elements may be definitive within a range, probabilistic, or both. The document fingerprint, or digital fingerprint, may comprise a digital or electronic record of the document based on an image of the document, based on image data associated with the document, and/or based on a virtual representation of the document. By way of further example, the document fingerprint may include a spatial relationship between one or more features, artifacts, and/or indicia appearing or existing on the document. In some examples, the one or more features, artifacts, and/or indicia may be visual, textual, and/or audible in nature.

Each technique may allow for a particular variance that occurs as a result of taking different images of the same mail piece. Some of these techniques may be sufficient to establish uniqueness on their own. However, a combination of techniques may result in a more accurate determination and evaluation of the unique elements in order to virtually eliminate false positives (initially determined to be the same document) or false negatives (initially determined to be different documents).

Whereas a first technique or set of techniques may provide a result with a certain level of confidence, confidence in that result may be increased by combining further techniques. Alternatively, by combining the further techniques to analyzing the image, it may be shown that the initial result was in error.

By identifying the document according to the unique elements or characteristics of the document itself, it is possible to keep the physical document free of unnecessary ink, such as a sprayed-on ID tag, to keep the document clean and be environmentally conscious in using less ink in the process. In some examples, the document fingerprint may be determined, at least in part, according to the arrangement, texture, size, reflectance, and/or other characteristics of the paper fibers of the document, rather than by what is, or is not, printed on the document.

The paper or other fibrous material, such as cotton, that makes up the physical structure of the document may include fibers that are visible to the right camera with proper lighting and magnification. The pattern of these fibers may be a random result of the paper-making process. In addition to the fibers themselves there is the way the fibers affect the application of ink to the paper, whether in the delivery address, return address, postage indicia, cancellation markings, and/or other marks, that may affect the document fingerprint.

If the mail piece is handwritten, the variation in handwriting may be used to identify or, conversely, distinguish a document. Even in the case where the same person prepares two documents which include the same written content, it is possible to distinguish the two documents based on the variation in handwriting, however subtle. By analyzing the writers handwriting, the two different documents written by the same person may be distinguished. The location of handwritten pixels and/or transitions of the document, for example, may be used as uniquely identifying marks.

In addition to the unique elements or features described for identifying mail pieces, such as address block dimensions, location, pixel count, etc., handwriting provides additional information which may be used to identify or distinguish the document. For example, the handwriting may be analyzed for line quality, line thickness, line density, transition points, average line slope, other writing characteristics, or any combination thereof.

Whether the document includes machine print or handwriting, a number of characteristics, elements, and/or features may provide a unique identification of the document. Certain features may include sufficient randomization to identify, sort, and/or otherwise process the documents. For example, the identifying features and/or indicia may include a position of a stamp on the mail piece, an image of the stamp (e.g., different issued stamps may be used on different mail pieces), an amount of metered postage, the date or other metering data in the metered postage area, the kind of indicia (e.g., stamps, metered, bulk mail, etc), or any combination thereof.

Cancellation marks also may be used to analyze a document, such as a mail piece. Cancellation marks may be referenced to the envelope and to the stamps they cancel. The cancellation mark may differ from one mail piece to another mail piece depending, for example, on the machine doing the cancelling. Even if there is no discernible difference in image content, there will be observable variations in inking, skew, and/or other such characteristics.

Figure 10:
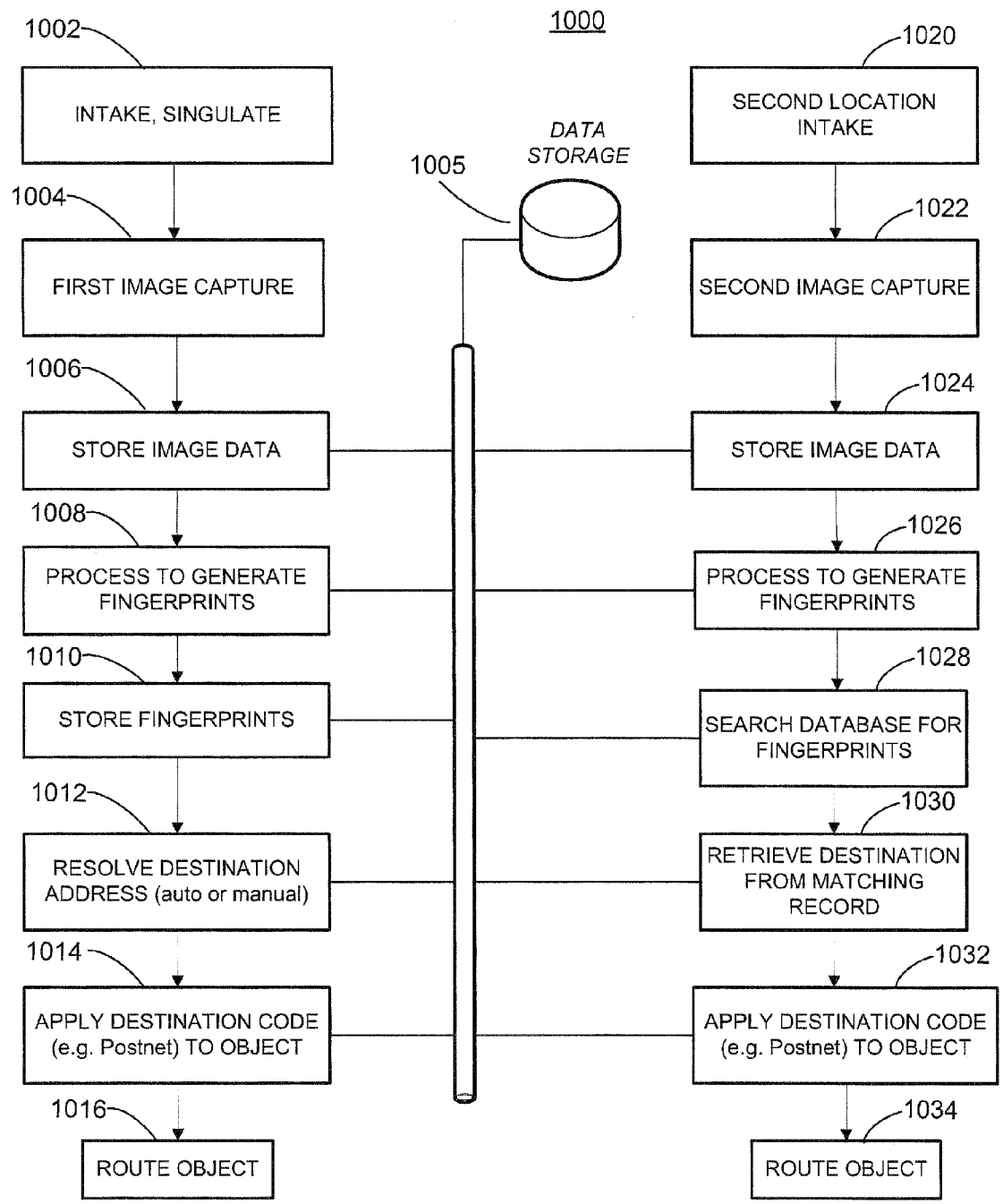
FIG. 10 illustrates an example process for comparing and/or distinguishing a first image and a second image associated with one or more documents.

FIG. 10 illustrates an example process 1000 for comparing and/or distinguishing a first image and a second image associated with one or more documents. At operation 1002, the document may be received or entered into the transport of the processing system. At operation 1004, the first image of the document may be captured. At operation 1006, the first image may be stored in a database 1005. At operation 1008, the first image may be processed to generate a document fingerprint. At operation 1010, the document fingerprint may be stored. The document fingerprint may be stored in database 1005.

The stored image data may include a destination address. For some documents, the destination address associated with the document may be resolved at operation 1012. At operation 1014, a destination code may be applied to the document. At operation 1016, the document may be routed or sorted according to the destination code. In some cases, the processing system may be unable to resolve the destination address based on the stored image data associated with the first scanned image. For example, the document may need to be taken off-line for further processing to identify the destination address.

At operation 1020, the document may be received and/or introduced for rescanning. In one example, the rescanning operation may be performed at a second location of the processing system, or by a separate processing system. The rescanning operation may be performed after the destination address for the document was identified. The destination address may be associated with the fingerprint of the first image in the database 1005.

At operation 1022, the second image of the document may be captured. An image of the front of the mail piece may be captured as a first image or initial image. A second image of the mail piece together with a unique ID from the initial image of the mail piece may be sent to a video encoding station. The second image may be obtained as a result of reintroducing the mail piece on the same transport of the processing system used to obtain the first image.

In addition to identifying an object, such as a mail piece, some action may then be taken with respect to the identified object. For example, a mail piece may be processed when a ZIP code is applied to the mail piece. If the determination of the ZIP code initially fails, the mail piece patterns may be converted into a database entry that includes some encoding of the patterns. Furthermore, the image of the mail piece may be tagged with the index of the database entry, and the image of the mail piece may be sent off for further processing. The further processing may be performed on the image of the mail piece, instead of the mail piece itself. When the further processing is successfully completed, the result of that further processing may be added to the database entry for that mail piece.

The mail piece may then be physically scanned a second time. The second scan may be performed by a second device or second system that has access to the database which includes the mail piece images, the mail piece patterns, and the results of the further processing associated with the first scan. The image or patterns of the mail pieces may be compared with those in the database to identify the results of the further processing. The results of the further processing (e.g., a destination ZIP code, address, or identification) may be applied to the mail piece to assist in further routing or delivery of the mail piece to the destination.

At operation 1024, the second image may be stored in database 1005. At operation 1026, the second image may be processed to generate a document fingerprint. The document fingerprint also may be stored in database 1005. When a mail piece exits the transport of a mail processing system without being resolved by the address destination directory, a barcode or ID tag may not have been sprayed on the piece. The second image may provide a means or method to identify the mail piece and match it with the archived results from the video encoding. In this way, for example, the image matching technique may take the place of the missing barcode or ID tag.

At operation 1028, database 1005 is searched for a matching fingerprint. The document fingerprint associated with the second image may be compared with document fingerprints stored in the database 1005. Each mail piece is unique in some way. The unique elements of the mail piece may be used in lieu of the ID tag. The unique elements may be obtained and/or identified from the front of the mail piece, for example, when the mail piece is first run through the transport to identify the mail piece. The unique elements may further be used to re-identify the mail piece when the mail piece is rescanned, as part of a process to apply the now-finalized ZIP Code.

When the mail piece is rescanned, it is not necessary to re-extract exactly the same characteristics or unique elements obtained and/or identified from the mail piece in the initial scan. For example, the width of the destination address block may be measured slightly differently when the mail piece is rescanned (due, say, to slightly different transport speeds), or the skew on the mail piece may be slightly different (due to placement of the mail piece on the transport), and so on.

Despite these differences, the unique elements obtained during the initial scan and/or when the mail piece is rescanned may be used to similarly identify the same mail piece. For example, the unique characteristics may be compared using statistical analysis to identify an allowable range of variation, such that slight mismatches between the unique characteristics are not sufficient to confuse one mail piece with another, or to cause the misidentification of the same mail piece during multiple scanning operations.

Even two mail pieces that originate from the same sender and that are addressed to the same destination will have sufficient differences so that they may be distinguished from each other and uniquely identified based on the unique elements. For example, the two mail pieces may vary according to the placement of the address blocks, by difference in handwriting, by the number of pixels and number of transitions from black to white at each location across the mail piece, by irregularities in placement of cancellation marks, by ink wicking caused by paper fibers, by irregular inking caused by irregularities in the paper surface, by other unique elements, or any combination thereof. Even where the two mail pieces may otherwise look identical to the casual observer, the two mail pieces may still be distinguished based on the unique characteristics.

By using unique elements such as the dimensional qualities and printed characteristic of the mail piece, a unique ID may be assigned to a mail piece without using a second camera and/or printer. Whereas a camera may used to scan or rescan the document, other types of devices or sensors used to scan or otherwise capture an image may be used in place of, or in addition to, one or more cameras.

Image characterization which treats the image as one or more "characters" may readily compare, distinguish, ignore, or exclude variances that occur for the first image (initial scan) and the second image (rescan) of the document. This process can be used for the entire mail piece or portions of it in the same way that an OCR engine may distinguish different fonts of the character A. All of the printed information of the mail piece may be used to determine a unique document, or to distinguish a number of documents. Thresholds, whether determinative or probabilistic, may be set or established for each technique to allow for the variances of different images of the same document.

At operation 1030, a database record associated with the first image may be retrieved. At operation 1032, the destination address or destination code associated with the database record may be applied to the document. At operation 1034, the document may be routed or sorted according to the destination code.

The analysis and processing applied to mail pieces may extend to virtually any type of object which may benefit from the identification (and subsequent re-identification) through the use of any natural or artificial system in which randomness or widespread variation plays a substantial role. Patterns may be randomly or accidentally generated on the document. The patterns may be generated without any intent to duplicate a particular effect or characteristic. The patterns may be intentionally generated or generated as a subsidiary effect of an intentional process such as manufacturing. In some embodiments, the elements of the pattern must be discernible each time the object is presented for identification and they must be of sufficient variability that two otherwise similar objects are very unlikely to have substantially identical patterns. The effectively unique patterns may therefore be used for identification of the document or other type of object in which they occur.

That every snowflake is unique is a truism we all grow up with, but it conceals a substantial truth. If there is sufficient variational scope available to a pattern, it is extremely unlikely that any one pattern will be accidentally duplicated. The unique or almost-unique identification of an object based on the appearance of random or at least widely varying patterns on the object may be used to identify or recognize the object, whether it is an envelope, or a stolen jewel.

Although the characteristics and features of the document may be described as being generally random, some information included on the document, such as the delivery address, may not strictly speaking be random. It is not randomness per se that is important in the patterns used for identification;

rather, it is the high variability and essential uniqueness of the patterns that are significant. Practically any information that is highly variable from one object to the next can provide unique identification or differentiation of the objects provided the object characteristics can be quantified and encoded.

In some examples, the document may be viewed and/or rescanned by a second camera, different from the first camera that initially viewed or scanned the document. The second camera may be placed at a different distance, include a different focus, or may be skewed slightly with respect to the placement of the first camera. In addition, the document may have picked up additional "non-random" features as part of the wear and tear of daily life, or as part of a processing or sorting operation, that may introduce physical differences in the document itself, or that account for differences in the first and second scanned image apart from the random variation. The non-random variations between the first scanned image and the second scanned image may increase the likelihood that the same document is erroneously identified as being two different documents.

There are a number of ways to create a sufficiently robust system or feature set of the images so that the variations due to the camera or wear and tear of the document do not cause an erroneous identification. The number of characteristics or features of the document may be increased such that a subset of the features is sufficient to uniquely re-identify the object. For example, if one feature of the document changes or is altered after the first image is captured and before the second image is captured, the system may ignore or exclude the feature which changed, and instead compare a number of other features associated with the first and second images. When the first and second images vary as a result of changes to the document itself, the system may nevertheless be able to identify that the first and second images identify the same document.

Although there are many acceptable methods of encoding the extracted features, one method that handles small variations naturally encodes the features in such a way that nearly identical features give nearly identical encodings, to compensate or allow for variation in the scanning processes. For example, any two cameras or sensors may have different output, however minor the variation, when scanning the same object. The system may therefore accept a match even when the features in the database differ from the features determined from the rescanned image by some small but finite amount.

In one example, the second camera or its associated programming may have the ability to remove, ignore, exclude or accommodate the non-random characteristics of the document sufficiently to allow re-identification based on the random characteristics. For example, when a document is viewed by otherwise identical cameras varying only in distance to the document, the first and second images may vary in size by some uniform scale factor. The differences in image size due to the distance of the cameras may be accounted for in analyzing the random variations in the first and second images.

The features encoded in the database may be adjusted or modified to account for slight variations in the identified characteristics of the scanned image. For example, fourteen characters may be identified in the first line of a paragraph during a first scan, whereas fifteen characters may be identified in a second scan of the document. Recording the count of characters and allowing a mismatch of +/−1 character, for example, may be sufficient to accommodate the slight variation in the characteristics of the document when comparing the recorded features.

Once the features are all quantified, an entry may be made in the database that uniquely identifies the associated document. For example, when a first image of the mail piece does not provide sufficient identification to allow for finalized routing, the characteristics of the mail piece may be encoded into a database entry in such a way that a later encoding associated with a second image of the mail piece can be matched against the previous encoding associated with the first image.

Once the mail piece is identified, the mail piece may then be further processed to determine the destination address. After the delivery code for the mail piece is determined, it may be applied to the mail piece. The delivery code may be associated with the database entry that holds the features of the mail piece in response to tagging the image of the mail piece with the database index. The database index may be used to re-identify the mail piece and to attach, spray, or otherwise include the now-completed routing code (e.g., delivery ZIP code) to the mail piece.

Whereas the specification repeatedly provides examples identifying a mail piece or mail pieces, the systems, methods, processes, and operations described herein may also be used to analyze or compare other types of documents, files, forms, contracts, letters, or records associated with insurance, medical, dental, passports, tax, accounting, etc. Similarly, objects other than documents, such as manufactured parts, gem stones, art work, and coins, may be analyzed according to the systems, apparatus, methods, processes, and operations described herein. Image data corresponding to the object being analyzed may be captured by a variety of devices, such as a cell phone camera, which may further perform any and/or all of the various steps, methods, processes, and operations described herein.

The term "indicia" as used in this specification may apply to various features of a mail piece, document, or other object as described above. For example, indicia may include cancellation marks, address, name, stamps, forwarding information, etc. The systems, apparatus, methods, processes, and operations may apply equally well to indicia and anything else visible or discernable on the object to be identified, including random dirt marks and other physical characteristics such as the object's dimensions, weight, color, etc.

The system, apparatus, methods, processes, and operations described above may use dedicated processor systems, micro controllers, programmable logic devices, or microprocessors that may perform some or all of the operations described herein. Some of the operations described above may be implemented in software and other operations may be implemented in hardware. One or more of the operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, minicomputer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the examples may be modified in arrangement and detail without departing from such principles. We claim all modifications and variation coming within the spirit and scope of the following claims.

The invention claimed is:

1. A method, comprising:
capturing a first digital image of a physical object;
parsing the digital image into at least one region of interest;
extracting identifying information from the region of interest, the identifying information including at least one feature of the region of interest;
combining the at least one feature for each region of interest to form a digital fingerprint of the object;
storing the digital fingerprint in a database, wherein the database comprises a plurality of digital fingerprints each associated with a corresponding physical object;
subsequently, obtaining a second digital image of a second physical object;
parsing the second image into at least one region of interest of the second object;
extracting identifying information from the region of interest, the identifying information including at least one feature of the region of interest of the second object;
combining the at least one feature for each region of interest to form a digital fingerprint of the second object;
comparing the digital fingerprint of the second object to the digital fingerprints stored in the database; and
responsive to the comparison, return an indication as to whether the second object is the first object.

2. The method of claim 1 wherein the feature is identified by location in the image; and the feature location is stored in the database in relation to the digital fingerprint.

3. The method of claim 1 including selecting the region of interest based on relatively high variability of image information in that region among different instances of physical objects like the physical object.

4. The method of claim 1 including selecting a region of interest based on pre-defined regions of interest for the type of the physical object.

5. The method of claim 1 wherein the digital fingerprint comprises a defined pattern of multiple features extracted from the image.

6. The method of claim 5 wherein the pattern of features is pre-defined for the regions of interest for the type of the physical object.

7. The method of claim 5 wherein the pattern of features is user-defined.

8. The method of claim 5 wherein the defined pattern of features includes information on how to apply the pattern either alone or in a defined and prioritized order with other defined patterns.

9. The method of claim 5 wherein the defined pattern of features specifies what generic and specific information to return in response to the comparison step.

10. The method of claim 1 wherein the comparing of digital fingerprints includes comparison of individual elements and combining the results of comparisons of individual elements.

11. The method of claim 1 wherein the indication as to whether the second object is the first object is based on a deterministic threshold range, probabilistic, or both.

12. The method of claim 1 wherein the indication is based on at least one of (a) image data associated with the object and (b) a virtual representation of the object.

13. The method of claim 1 wherein the document fingerprint defines a spatial relationship between one or more features, artifacts, and/or indicia appearing or existing on the physical object.

14. The method of claim 13 wherein the one or more features, artifacts, and/or indicia may be visual, textual, and/or audible in nature.

15. A method, comprising:
capturing a first digital image of a physical object;
parsing the digital image into at least one region of interest;
extracting identifying information from the region of interest, the identifying information including at least one feature located within the region of interest, wherein the feature naturally occurs on the physical object and is not added to it for purposes of identification;
combining the at least one feature for each region of interest to form a digital fingerprint of the object;
storing the digital fingerprint in a database, wherein the database comprises a plurality of digital fingerprints each associated with a corresponding physical object;
subsequently, obtaining a second digital image of a second physical object;
parsing the second image into at least one region of interest of the second object;

extracting identifying information from the region of interest, the identifying information including at least one feature of the region of interest of the second object;

querying the database to return digital fingerprint records that include at least one feature located in the same region of interest as the feature of the second object;

comparing the feature of the second object to the digital fingerprints returned in response to the querying step; and responsive to the comparison, return an indication as to whether the second object is the first object.

16. The method of claim 15 wherein the features extracted from the first and second images for identification include surface scratches or other indicia that occur during manufacture, assembly, handling, or usage.

17. The method of claim 15 wherein the features extracted from the first and second images for identification include surface scratches or other indicia that occur as a subsidiary effect of an intentional process.

18. The method of claim 15 including selecting the feature based on relatively high variability of image information for that feature among different instances of the physical object.

* * * * *